United States Patent
Saito et al.

(10) Patent No.: US 9,290,169 B2
(45) Date of Patent: Mar. 22, 2016

(54) VEHICLE CONTROL APPARATUS

(75) Inventors: Masakazu Saito, Hamamatsu (JP); Yoshiki Ito, Hamamatsu (JP); Masaaki Tagawa, Hamamatsu (JP); Hitoshi Ohkuma, Hamamatsu (JP)

(73) Assignee: SUZUKI MOTOR CORPORATION, Hamamatsu-shi, Shizuoka (JP)

(*) Notice: Subject to any disclaimer, the term of this patent is extended or adjusted under 35 U.S.C. 154(b) by 130 days.

(21) Appl. No.: 13/982,940

(22) PCT Filed: Feb. 4, 2011

(86) PCT No.: PCT/JP2011/052372
§ 371 (c)(1),
(2), (4) Date: Nov. 8, 2013

(87) PCT Pub. No.: WO2012/105043
PCT Pub. Date: Aug. 9, 2012

(65) Prior Publication Data
US 2014/0058640 A1 Feb. 27, 2014

(51) Int. Cl.
*B60L 7/26* (2006.01)
*B60T 13/58* (2006.01)
(Continued)

(52) U.S. Cl.
CPC .............. *B60T 13/586* (2013.01); *B60K 6/445* (2013.01); *B60L 7/18* (2013.01); *B60L 7/26* (2013.01);
(Continued)

(58) Field of Classification Search
CPC ..... B60T 13/586; B60L 15/2009; B60L 7/26; B60L 7/18; B60L 2240/423; B60L 2240/12; B60L 2240/463; B60W 30/18127; B60W 10/184; B60W 10/08; B60W 20/00; B60W 2720/106; B60W 2540/10; B60W 2710/083; B60W 2710/105; B60K 6/445; Y02T 10/7275; Y02T 10/92; Y02T 10/648; Y02T 10/6239; Y10S 903/947
See application file for complete search history.

(56) References Cited

U.S. PATENT DOCUMENTS 5,905,349 A * 5/1999 Farkas et al. .................. 318/432
6,278,916 B1 * 8/2001 Crombez ......................... 701/22
7,591,339 B2 * 9/2009 Sugimoto et al. ............. 180/242

FOREIGN PATENT DOCUMENTS

JP 07-154905 A 6/1995
JP 11-332005 A 11/1999
(Continued)

OTHER PUBLICATIONS

Form PCT/ISA/210 International Search Report issued in International Application No. PCT/JP2011/052372 with English translation, date of mailing Mar. 8, 2011 (5 pages).

*Primary Examiner* — James Trammell
*Assistant Examiner* — Adam Mott
(74) *Attorney, Agent, or Firm* — Flynn, Thiel, Boutell & Tanis, P.C.

(57) ABSTRACT

A control unit (17) includes a regenerative coordination control unit (17D) and a vehicle speed calculation unit (17E). The regenerative coordination control unit (17D) performs a regeneration cooperative control to distribute the hydraulic braking force and the regenerative braking force. The vehicle speed calculation unit (17E) calculates a vehicle speed. The control unit (17) calculates a basic target driving force based on: an amount of accelerator operation detected by an accelerator operation amount detecting unit (32), and the vehicle speed calculated by the vehicle speed calculation unit (17E), and adds a value corresponding to the regenerative braking force distributed by the regenerative coordination control unit (17D) to the basic target driving force, thus obtaining a target driving force to be generated by motors (4 and 5).

1 Claim, 7 Drawing Sheets

(51) Int. Cl.

| | | |
|---|---|---|
| *B60K 6/445* | (2007.10) | |
| *B60W 10/08* | (2006.01) | |
| *B60W 10/184* | (2012.01) | |
| *B60W 20/00* | (2006.01) | |
| *B60W 30/18* | (2012.01) | |
| *B60L 7/18* | (2006.01) | |
| *B60L 15/20* | (2006.01) | |

(52) U.S. Cl.
CPC ............ *B60L 15/2009* (2013.01); *B60W 10/08* (2013.01); *B60W 10/184* (2013.01); *B60W 20/00* (2013.01); *B60W 30/18127* (2013.01); *B60L 2240/12* (2013.01); *B60L 2240/423* (2013.01); *B60L 2240/463* (2013.01); *B60W 2540/10* (2013.01); *B60W 2710/083* (2013.01); *B60W 2710/105* (2013.01); *B60W 2720/106* (2013.01); *Y02T 10/6239* (2013.01); *Y02T 10/648* (2013.01); *Y02T 10/7275* (2013.01); *Y02T 10/92* (2013.01); *Y10S 903/947* (2013.01)

(56) References Cited

FOREIGN PATENT DOCUMENTS

| JP | 2000-225932 A | 8/2000 |
|---|---|---|
| JP | 2000-308209 A | 11/2000 |
| JP | 2009-189074 A | 8/2009 |

* cited by examiner

VEHICLE CONTROL APPARATUS

TECHNICAL FIELD

The present invention relates to a vehicle control apparatus, especially, to a vehicle control apparatus that generates a vehicle braking force by using a combination of a hydraulic braking force and a regenerative braking force in an electric-powered vehicle with a motor (an electric machine) as a power source.

BACKGROUND ART

Vehicles include what is called a hybrid vehicle. The hybrid vehicle includes an engine and a motor (an electric machine) other than the engine as a driving source to improve its fuel efficiency as an electric-powered vehicle.

This hybrid vehicle generates a creep driving force, which is frequently used in an automatic transmission vehicle, by a motor. This ensures comfortable drivability for a user having switched from the automatic transmission vehicle.

Patent Document 1: Japanese Unexamined Patent Application Publication No. 11-69508
Patent Document 2: Japanese Unexamined Patent Application Publication No. 2000-102113
Patent Document 3: Japanese Unexamined Patent Application Publication No. 2000-13904

A creep torque control apparatus of an electric car according to Patent Document 1 is disposed in a hybrid vehicle with a three shaft-type power input/output unit. The creep torque control apparatus reduces an output of the engine and a reaction force torque of the motor to reduce the creep torque, thus appropriately controlling the creep torque. The creep torque control apparatus also prevents an unnecessary consumption of energy by the creep torque without a loss of operability during a reverse movement.

In a creep force generating apparatus of an electric car according to Patent Document 2, in the case where the vehicle retreats and advances with a vehicle speed equal to or less than a vehicle speed at the creep limit after the vehicle has stopped, a value corresponding to a depressed state of a brake pedal is set equal to or less than a predetermined value to generate a creep force. This generates a creep force while suppressing unnecessary motor operation.

A torque control apparatus of an electric car according to Patent Document 3 includes a regenerative cooperative system. In the case where the driver obviously intends to stop the vehicle during deceleration, the torque control apparatus performs regenerative operation of the motor until immediately before the vehicle is stopped.

DISCLOSURE OF THE INVENTION

Problems to be Solved by the Invention

However, conventionally, a hybrid vehicle with a regenerative cooperative system distributes a regenerative braking force and a hydraulic braking force within a predetermined maximum regenerative force. Accordingly, in the case where a target driving force where a brake operation is performed during running at a low vehicle speed is a positive driving force, that is, a driving force that allows creep running, the driving force may not be reduced and the deceleration may be performed only by the hydraulic braking force.

This hinders the reduction of the power consumption during deceleration while the vehicle is running. Additionally, in the case where the creep force is reduced while the vehicle is stopped, the following problem occurs. On an uphill road where the vehicle can be stopped by the conventional creep force, the vehicle retreats due to a reduction in the braking force of the vehicle.

Therefore, the present invention is made to provide a vehicle control apparatus that reduces power consumption during deceleration while a vehicle is running and prevents the vehicle from retreating on an uphill road.

Solutions to the Problems

With the present invention, a vehicle control apparatus includes a motor, a hydraulic braking unit, a brake operation amount detecting unit, a control unit, and an accelerator operation amount detecting unit. The motor is configured to drive a wheel and generate a regenerative braking force. The hydraulic braking unit is configured to generate a hydraulic braking force. The brake operation amount detecting unit is configured to detect an amount of brake operation. The control unit includes a required braking force calculation unit configured to calculate a required value for vehicle braking based on the amount of brake operation detected by the brake operation amount detecting unit, and a regenerative coordination control unit configured to perform a regeneration cooperative control that distributes the hydraulic braking force and the regenerative braking force based on the required value for vehicle braking calculated by the required braking force calculation unit. The accelerator operation amount detecting unit is configured to detect an amount of accelerator operation. The regenerative coordination control unit is configured to increase the regenerative braking force corresponding to the amount of brake operation detected by the brake operation amount detecting unit. The control unit includes a vehicle speed calculation unit configured to calculate a vehicle speed, and obtains a target driving force to be generated by the motor by: calculating a basic target driving force based on: the amount of accelerator operation detected by the accelerator operation amount detecting unit, and the vehicle speed calculated by the vehicle speed calculation unit; and adding a value to the basic target driving force. The value corresponds to the regenerative braking force distributed by the regenerative coordination control unit.

Effects of the Invention

The vehicle control apparatus of the present invention reduces power consumption during deceleration while the vehicle is running and prevents the vehicle from retreating on an uphill road.

DESCRIPTION OF PREFERRED EMBODIMENTS

The present invention realizes the object where power consumption is reduced during deceleration while the vehicle is running and retreating of the vehicle is prevented on an uphill road by reducing a creep driving force while the vehicle is running corresponding to a brake operation of a driver.

Embodiment

FIG. 1 to FIG. 7 illustrate an embodiment of the present invention.

Figure 1:
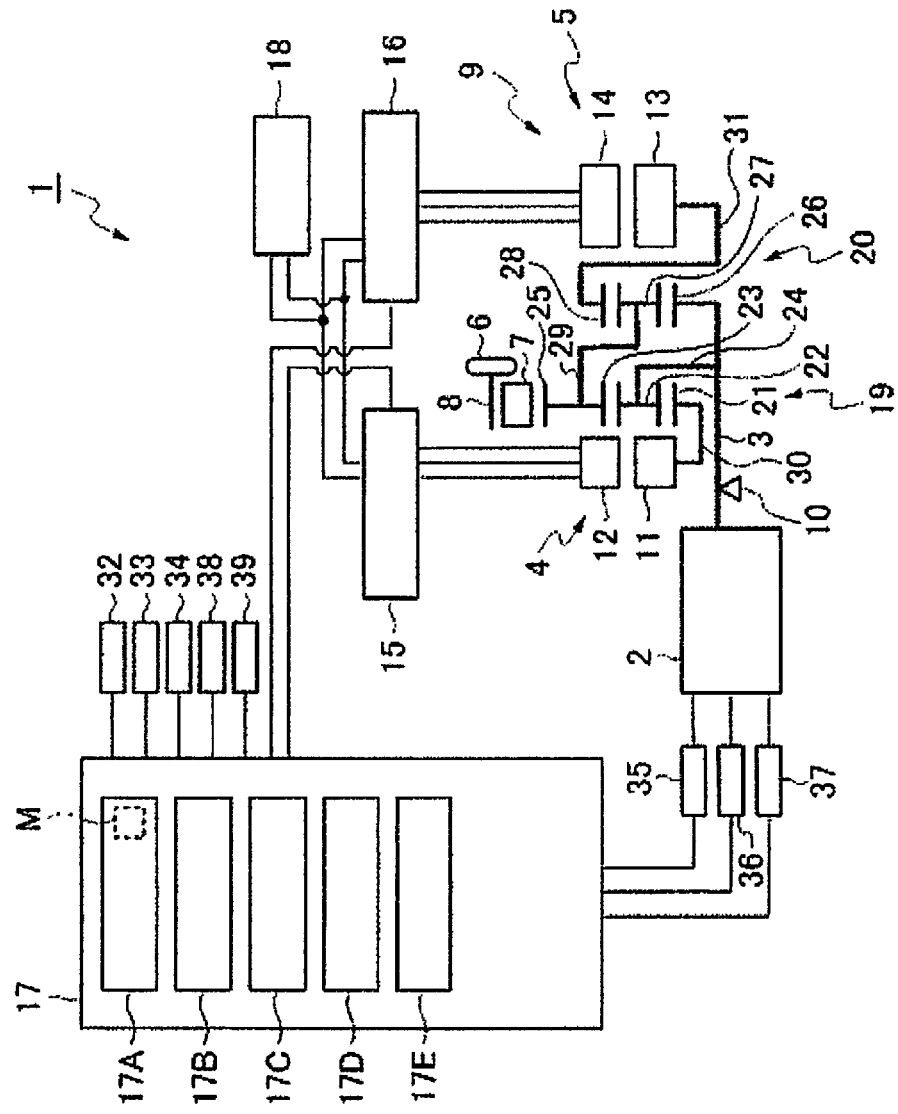
FIG. 1 is a system block diagram of a vehicle control apparatus (in an embodiment).

In FIG. 1, reference numeral 1 denotes a vehicle control apparatus for a hybrid vehicle as an electric-powered vehicle.

The vehicle control apparatus 1 includes an output shaft 3 of an engine 2, a first motor 4 and a second motor 5 as a plurality of motors, a drive shaft 8, and a power transmission mechanism (a differential gear mechanism) 9. The engine 2 is a driving source that outputs a torque. The drive shaft 8 is coupled to a drive wheel 6 as a wheel via an output transmission mechanism 7. The power transmission mechanism 9 is coupled to each of the output shaft 3 of the engine 2, the first motor 4 and the second motor 5 as the plurality of motors (electric machines), and the drive shaft 8. The first motor 4 and the second motor 5 each drives the drive wheel 6 that functions as an output shaft of the power transmission mechanism 9, and each generates regenerative braking forces.

In the middle of the output shaft 3 of the engine 2, a one-way clutch 10 is disposed at the engine 2 side. This one-way clutch 10 prevents inverse rotation of the engine 2, and receives a torque reactive force of the second motor 5 during EV (electric vehicle) running.

The first motor 4 includes a first rotor 11 and a first stator 12. The second motor 5 includes a second rotor 13 and a second stator 14.

The vehicle control apparatus 1 includes a first inverter 15, a second inverter 16, and a control unit (an ECU) 17. The first inverter 15 controls operation of the first motor 4. The second inverter 16 controls operation of the second motor 5. The control unit 17 communicates with both of the first inverter 15 and the second inverter 16.

The first inverter 15 is coupled to the first stator 12 of the first motor 4. The second inverter 16 is coupled to the second stator 14 of the second motor 5.

The first inverter 15 and the second inverter 16 include respective power supply terminals coupled to a battery (a high voltage battery for driving) 18. This battery 18 allows the exchanging of electric power with the first motor 4 and the second motor 5. That is, during power running (transmitting a power to the wheel (the drive wheel) for acceleration, or for maintaining a balanced speed on a rising slope), respective electric powers are supplied to the first motor 4 and the second motor 5 from the battery 18 through the first inverter 15 and the second inverter 16. On the other hand, during regeneration, the battery 18 is charged through the first inverter 15 and the second inverter 16.

This vehicle control apparatus 1 drivingly controls the hybrid vehicle using respective outputs from the engine 2, the first motor 4, and the second motor 5.

The power transmission mechanism 9 is what is called a four-shaft type power input/output unit where the output shaft 3 of the engine 2 and the drive shaft 8 are disposed. The first motor 4 is disposed at the engine 2 side and the second motor 5 is disposed at the drive shaft 8 side. The power transmission mechanism 9 combines a power of the engine 2, a power of the first motor 4, and a power of the second motor 5 to output the combined power to the drive shaft 8. The power transmission mechanism 9 transmits and receives power among the engine 2, the first motor 4, the second motor 5, and the drive shaft 8.

The power transmission mechanism 9 is constituted by arranging a first planetary gear mechanism 19 and a second planetary gear mechanism 20 side by side. Two rotational elements of the first planetary gear mechanism 19 and two rotational elements of the second planetary gear mechanism 20 are coupled to one another.

The first planetary gear mechanism 19 includes a first sun gear 21, a first pinion gear 22, a first ring gear 23, a first carrier 24, and an output gear 25. The first pinion gear 22 engages the first sun gear 21. The first ring gear 23 engages the first pinion gear 22. The first carrier 24 is coupled to the first pinion gear 22. The output gear 25 is coupled to the first ring gear 23.

The second planetary gear mechanism 20 includes a second sun gear 26, a second pinion gear 27, a second ring gear 28, and a second carrier 29. The second pinion gear 27 engages the second sun gear 26. The second ring gear 28 engages the second pinion gear 27. The second carrier 29 is coupled to the second pinion gear 27.

In the power transmission mechanism 9, the first carrier 24 of the first planetary gear mechanism 19 is coupled to the output shaft 3 of the engine 2. The second carrier 29 of the second planetary gear mechanism 20 is coupled to the first ring gear 23 and the output gear 25 of the first planetary gear mechanism 19.

The first sun gear 21 is coupled to the first rotor 11 of the first motor 4 via a first motor output shaft 30. The first carrier 24 and the second sun gear 26 are coupled to the output shaft 3 of the engine 2. The first ring gear 23 and the second carrier 29 are coupled to the drive shaft 8 via the output gear 25 and the output transmission mechanism 7. The second ring gear 28 is coupled to the second rotor 13 of the second motor 5 via a second motor output shaft 31.

That is, in the power transmission mechanism 9, the first carrier 24 of the first planetary gear mechanism 19 and the second sun gear 26 of the second planetary gear mechanism 20 are combined, and then coupled to the output shaft 3 of the engine 2. The first ring gear 23 of the first planetary gear mechanism 19 and the second carrier 29 of the second planetary gear mechanism 20 are combined, and then coupled to the drive shaft 8. The first sun gear 21 of the first planetary gear mechanism 19 is coupled to the first motor 4. The second ring gear 28 of the second planetary gear mechanism 20 is coupled to the second motor 5. Thus, the power transmission mechanism 9 transmits or receives power among the engine 2, the first motor 4, the second motor 5, and the drive shaft 8.

The control unit 17 communicates with an accelerator operation amount detecting unit 32, a brake operation amount detecting unit 33, and an engine rotation speed detecting unit 34. The accelerator operation amount detecting unit 32 detects a depression amount of the accelerator pedal as an amount of accelerator operation. The brake operation amount detecting unit 33 detects a depression amount of the brake pedal as an amount of brake operation. The engine rotation speed detecting unit 34 detects an engine rotation speed.

The control unit 17 communicates with an air volume adjusting mechanism 35, a fuel supply mechanism 36, and an ignition timing adjusting mechanism 37 to control the engine 2.

Figure 2:
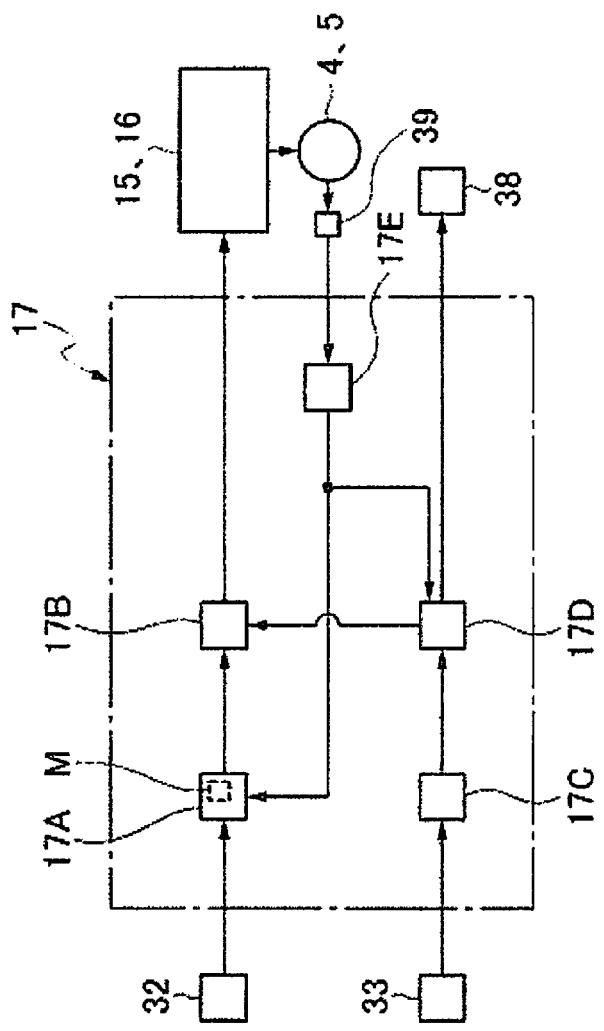
FIG. 2 is a control block diagram of the vehicle control apparatus (in the embodiment).

As illustrated in FIG. 1 and FIG. 2, the control unit 17 includes a basic target driving force calculation unit 17A, a target driving force calculation unit 17B, a required braking force calculation unit 17C, a regenerative coordination control unit 17D, and a vehicle speed calculation unit 17E. The basic target driving force calculation unit 17A communicates with the accelerator operation amount detecting unit 32. The target driving force calculation unit 17B communicates with the basic target driving force calculation unit 17A, the first inverter 15, and the second inverter 16. The required braking force calculation unit 17C communicates with the brake operation amount detecting unit 33. The regenerative coordination control unit 17D communicates with the required braking force calculation unit 17C and the target driving force calculation unit 17B. The vehicle speed calculation unit 17E communicates with the basic target driving force calculation unit 17A and the regenerative coordination control unit 17D. The regenerative coordination control unit 17D communicates with a hydraulic braking unit 38 that generates a hydraulic braking force. The vehicle speed calculation unit 17E communicates with a motor rotation speed detecting unit 39 that detects respective rotation speeds (motor rotation speeds) of the first motor 4 and the second motor 5.

The basic target driving force calculation unit 17A calculates a basic target driving force based on an amount of accelerator operation detected by the accelerator operation amount detecting unit 32 and a vehicle speed calculated by the vehicle speed calculation unit 17E, and then outputs this basic target driving force to the target driving force calculation unit 17B. Therefore, a basic target driving force map M that includes the amount of accelerator operation and the vehicle speed is preliminarily set in the basic target driving force calculation unit 17A.

The target driving force calculation unit 17B calculates a target driving force based on the basic target driving force and the regenerative braking force to output the target driving force to the first inverter 15 and the second inverter 16.

The required braking force calculation unit 17C calculates a required value for vehicle braking based on the amount of brake operation detected by the brake operation amount detecting unit 33 to output the required value for vehicle braking to the regenerative coordination control unit 17D.

The regenerative coordination control unit 17D performs a regeneration cooperative control to distribute the hydraulic braking force and the regenerative braking force based on the required value for vehicle braking calculated by the required braking force calculation unit 17C. Then, the regenerative coordination control unit 17D outputs the hydraulic braking force to the hydraulic braking unit 38, and outputs the regenerative braking force to the target driving force calculation unit 17B.

Figure 6:
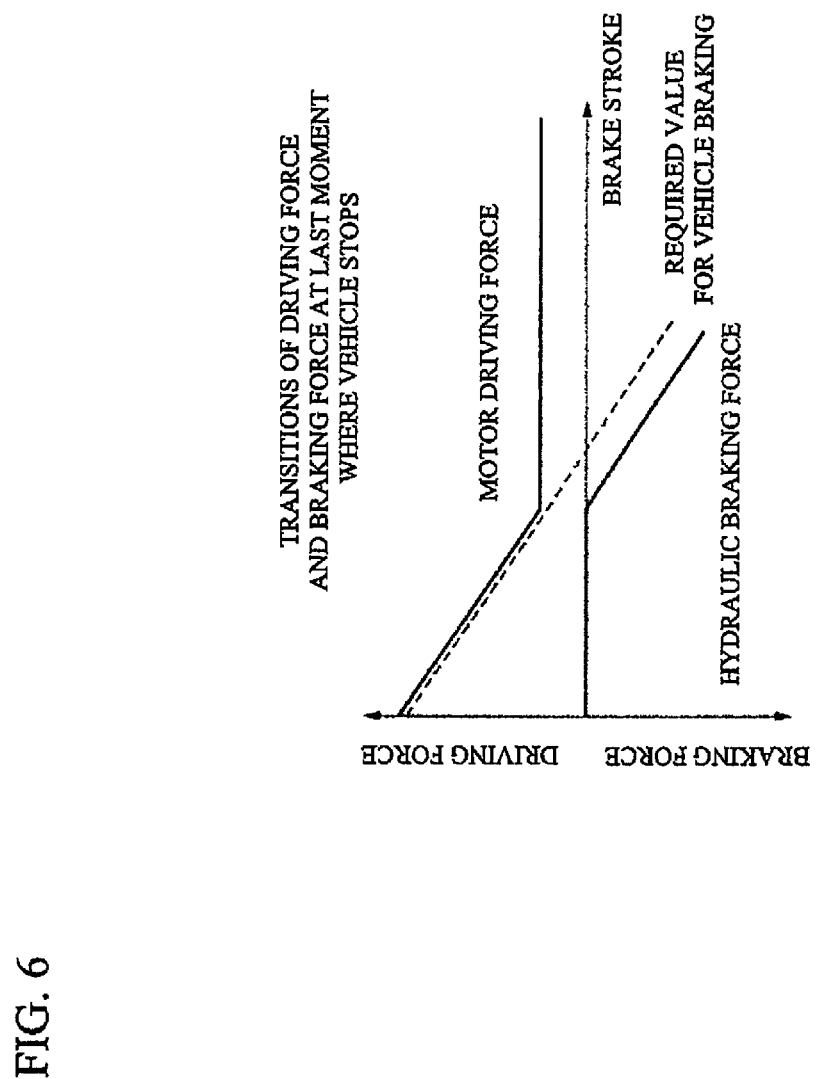
FIG. 6 is a graph illustrating transitions of a driving force and a braking force at the last moment where the vehicle stops (in the embodiment).
Figure 7:
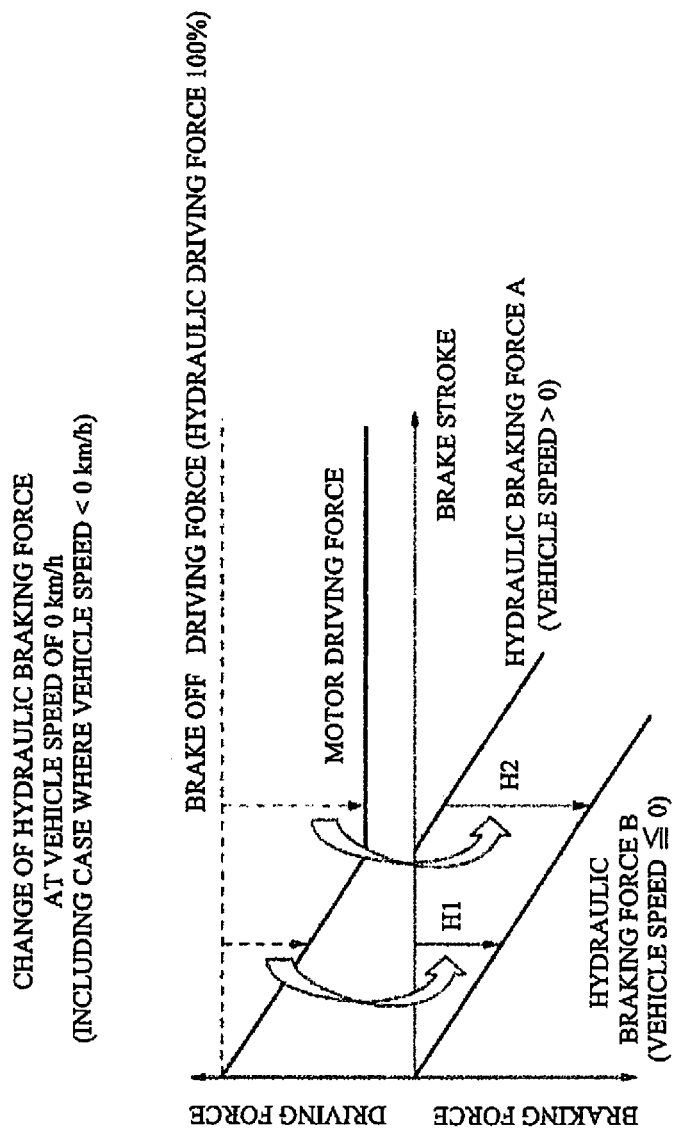
FIG. 7 is a graph illustrating a change of a hydraulic braking force at a vehicle speed of zero km/h (including a case where the vehicle speed<zero km/h) (in the embodiment).

As illustrated in FIG. 6 and FIG. 7, the regenerative coordination control unit 17D increases the regenerative braking force corresponding to the amount of brake operation detected by the brake operation amount detecting unit 33. In the case where the vehicle speed calculated by the vehicle speed calculation unit 17E indicates zero or reverse movement, the regenerative coordination control unit 17D sets the regenerative braking force to zero such that the hydraulic braking force becomes equivalent to the required value for vehicle braking. Additionally, in the case where the regenerative coordination control unit 17D sets the regenerative braking force to zero such that the hydraulic braking force becomes equivalent to the required value for vehicle braking, the regenerative coordination control unit 17D changes the hydraulic braking force by a predetermined changing rate.

The vehicle speed calculation unit 17E calculates a vehicle speed based on the respective rotation speeds of the first motor 4 and the second motor 5 to output the vehicle speed to the basic driving force calculation unit 17A to the regenerative coordination control unit 17D.

Subsequently, the control unit 17 calculates a basic target driving force based on the amount of accelerator operation detected by the accelerator operation amount detecting unit 32 and the vehicle speed calculated by the vehicle speed calculation unit 17E. The control unit 17 sets a target driving force to be generated by the first motor 4 and the second motor 5 by adding a value corresponding to the regenerative braking force distributed by the regenerative coordination control unit 17D to the basic target driving force.

That is, in this embodiment, the hybrid vehicle includes the regenerative coordination control unit 17D that controls friction braking and motor regeneration such that the required value for the vehicle braking force is set to a sum of the regenerative braking force and the hydraulic braking force. In this hybrid vehicle, in a low vehicle speed range, the basic target driving force is calculated based on the basic target driving force map M that is preliminarily set with the amount of accelerator operation and the vehicle speed as parameters such that a forward driving force is provided for creep running even in the case where the amount of accelerator operation is zero (0). Also in a low vehicle speed range including vehicle stop, the regenerative coordination control unit 17D calculates a regeneration command value. The regeneration command value is added to the basic target driving force to set a target driving force. In the case where a continuous vehicle is equal to or less than zero km/h, the regenerative coordination control unit 17D generates a hydraulic braking force corresponding to the regeneration command value.

Next, a description will be given of a motor control in this embodiment based on a flowchart of FIG. 3.

Figure 3:
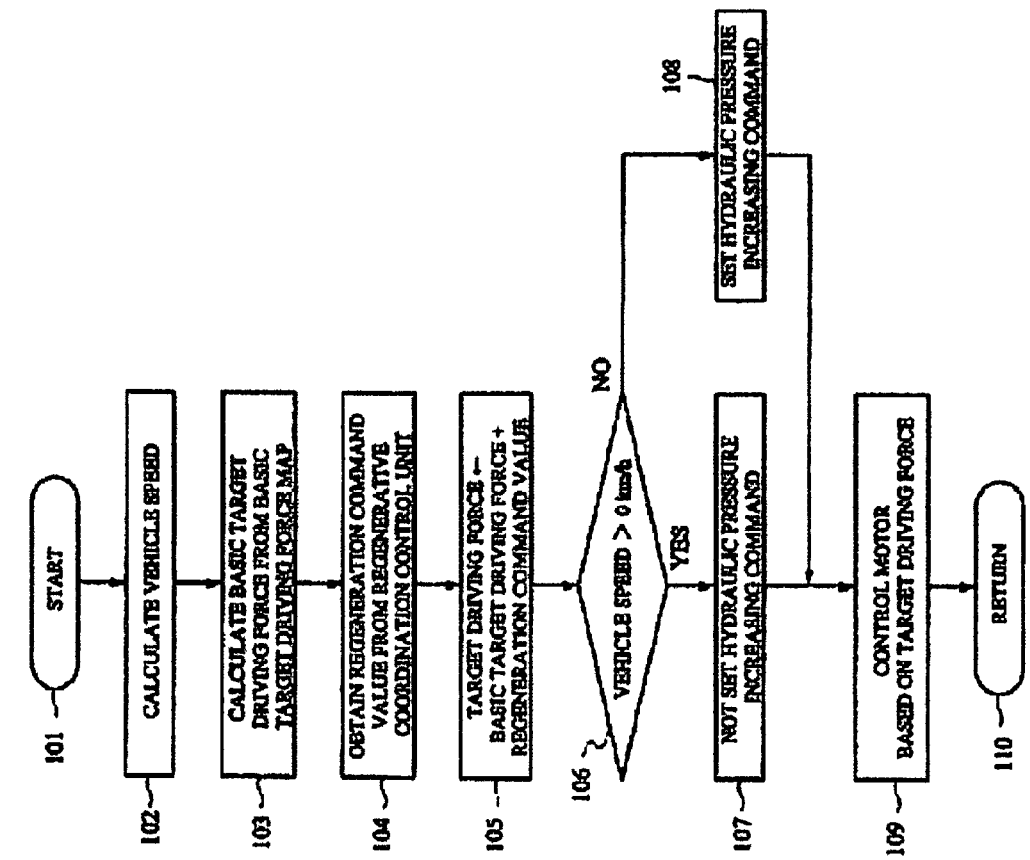
FIG. 3 is a flowchart of a motor control (in the embodiment).

This routine in FIG. 3 is periodically executed.

As illustrated in FIG. 3, when a program of the control unit 17 starts (in step 101), first, a vehicle speed is calculated based on respective rotation speeds of the first motor 4 and the second motor 5 (in step 102). Subsequently, a detected amount of accelerator operation and the calculated vehicle speed are used to calculate a basic target driving force based on the basic target driving force map M, which is preliminarily set (in step 103). A regeneration command value is obtained from the regenerative coordination control unit 17D (in step 104). The regeneration command value is added to the basic target driving force to calculate a target driving force (in step 105).

Subsequently, it is determined whether or not the vehicle speed is larger than zero km/h (in step 106).

In the case where the determination result in step 106 is YES and the vehicle speed is larger than zero km/h, a hydraulic pressure increasing command is "not set" (in step 107).

On the other hand, in the case where the determination result in step 106 is NO and the vehicle speed is equal to or less than zero km/h, the hydraulic pressure increasing command is "set" (in step 108). Here, a state where the vehicle speed is equal to or less than zero km/h means a vehicle stop state where the vehicle speed is zero km/h or a vehicle retreating state where the vehicle speed is less than zero km/h, that is, a state where the vehicle retreats on an uphill road for example.

After the process in step 107 or after the process in step 108, a creep driving force is reduced corresponding to a required value for vehicle braking. Accordingly, the first motor 4 and the second motor 5 are drivingly controlled by the target driving force described above (in step 109) (see FIG. 6), and the program is returned (in step 110).

Next, a description will be given of the regenerative coordination control unit 17D for controlling a hydraulic braking force, based on a flowchart of FIG. 4.

Figure 4:
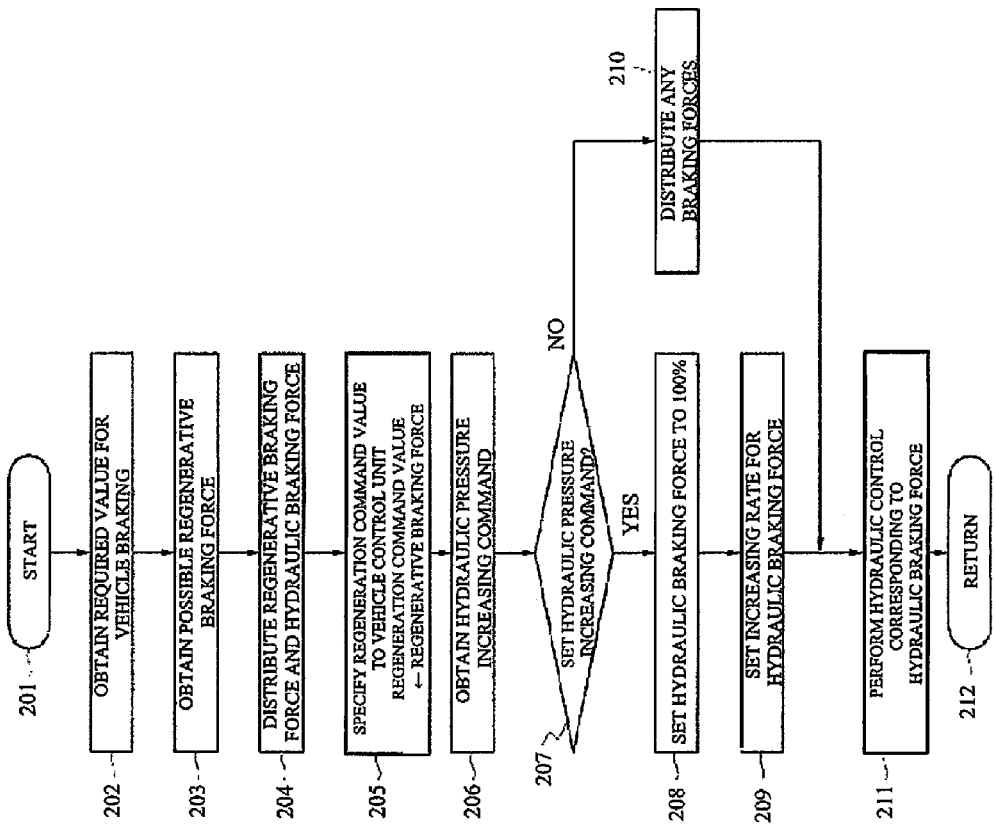
FIG. 4 is a flowchart of a control by a regenerative coordination control unit (in the embodiment).

This routine in FIG. 4 is periodically executed.

As illustrated in FIG. 4, when a program of the control unit 17 starts (in step 201), first, a required value for vehicle braking is obtained (in step 202). Then, a possible regenerative braking force is obtained by subtracting the maximum regenerative braking force from the basic target driving force where the amount of accelerator operation is zero (0) (in step 203) (see FIG. 5). A regenerative braking force and a hydraulic braking force are distributed within a range of the possible regenerative braking force corresponding to the required value for vehicle braking (in step 204). The regenerative braking force is specified as a regeneration command value (in step 205). The hydraulic pressure increasing command, which is determined above, is obtained (in step 206).

Subsequently, it is determined whether or not the hydraulic pressure increasing command is set (in step 207).

In the case where the determination result in step 207 is YES and the hydraulic pressure increasing command is set, the regenerative braking force is set to 0% and the hydraulic braking force is set to 100% in the distribution (see H1 in FIG. 7). The hydraulic braking force is calculated with this distribution of the braking forces (in step 208). An increasing rate for the hydraulic braking force is increased with a predefined changing rate (in step 209).

Figure 5:
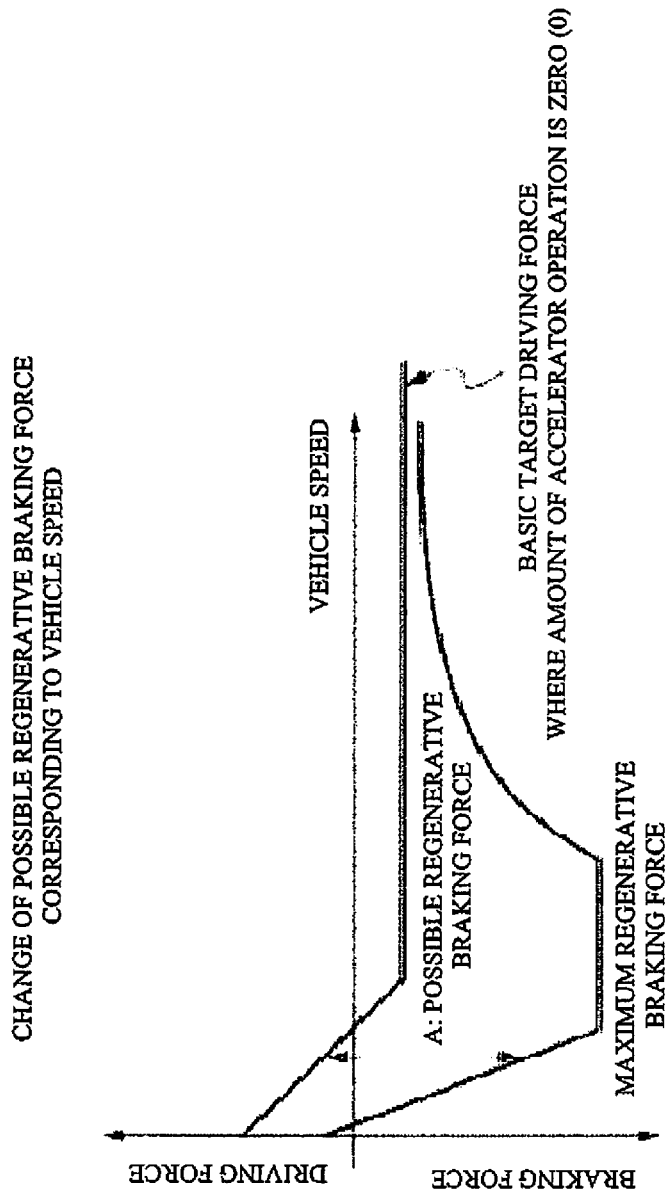
FIG. 5 is a graph illustrating a change of a possible regenerative braking force corresponding to a vehicle speed (in the embodiment).

On the other hand, in the case where the determination result in step 207 is NO and the hydraulic pressure increasing command is not set, any distribution of the braking forces is performed (in step 210) (see FIG. 5 and FIG. 6).

Subsequently, after the process of step 209 or after the process of step 210, a hydraulic control is performed corresponding to the hydraulic braking force (in step 211), and the program is returned (in step 212).

As described above, the embodiment of the present invention has been described. A description will be given of the above-described configurations of the embodiment corresponding to each claim.

First, in the invention (1), the control unit 17 includes the regenerative coordination control unit 17D and the vehicle speed calculation unit 17E. The regenerative coordination control unit 17D performs a regeneration cooperative control to distribute the hydraulic braking force and the regenerative braking force. The vehicle speed calculation unit 17E calculates a vehicle speed. The control unit 17 obtains a target driving force to be generated by the first motor 4 and the second motor 5 by: calculating a basic target driving force based on the amount of accelerator operation detected by the accelerator operation amount detecting unit 32, and the vehicle speed calculated by the vehicle speed calculation unit 17E; and adding a value to the basic target driving force. The value corresponds to the regenerative braking force distributed by the regenerative coordination control unit 17D.

This reduces a creep driving force while the vehicle is running corresponding to a brake operation of a driver, thus reducing power consumption.

In the invention (2), the regenerative coordination control unit 17D of the control unit 17 sets the regenerative braking force to zero and sets the hydraulic braking force equivalent to the required value for vehicle braking in a case where the vehicle speed calculated by the vehicle speed calculation unit 17E indicates zero or reverse movement.

This prevents the vehicle from retreating while reducing a creep driving force on an uphill road.

In the invention (3), the vehicle speed calculation unit 17E of the control unit 17 is configured to calculate the vehicle speed based on the rotation speeds of the first motor 4 and the second motor 5.

This calculates the vehicle speed based on accurate rotation speeds of the first motor 4 and the second motor 5, thus ensuring switching between the regenerative braking force and the hydraulic braking force.

In the invention (4), the regenerative coordination control unit 17D of the control unit 17 changes the hydraulic braking force with a preliminarily set changing rate in a case where the regenerative braking force is set to zero and the hydraulic braking force is set equivalent to the required value for vehicle braking.

This reduces a sudden change in the braking force by switching between the regenerative braking force and the hydraulic braking force.

INDUSTRIAL APPLICABILITY

The vehicle control apparatus according to the present invention is not limited to a hybrid vehicle, and is applicable to another electric-powered vehicle such as an electric car.

DESCRIPTION OF REFERENCE SIGNS 1 vehicle control apparatus
2 engine
4 first motor
5 second motor
6 drive wheel (wheel)
8 drive shaft
9 power transmission mechanism
15 first inverter
16 second inverter
17 control unit
17A basic target driving force calculation unit
17B target driving force calculation unit
17C required braking force calculation unit
17D regenerative coordination control unit
17E vehicle speed calculation unit
18 battery
32 accelerator operation amount detecting unit
33 brake operation amount detecting unit
34 engine rotation speed detecting unit
38 hydraulic braking unit
39 motor rotation speed detecting unit

The invention claimed is:

1. A vehicle control apparatus, comprising:
a motor configured to drive a wheel and generate a regenerative braking force;
a hydraulic braking unit configured to generate a hydraulic braking force;
a brake operation amount detecting unit configured to detect an amount of brake operation;
a control unit that includes a required braking force calculation unit configured to calculate a required value for vehicle braking based on the amount of brake operation detected by the brake operation amount detecting unit and a regenerative coordination control unit configured to perform a regeneration cooperative control that distributes the hydraulic braking force and the regenerative braking force based on the required value for vehicle braking calculated by the required braking force calculation unit; and
an accelerator operation amount detecting unit configured to detect an amount of accelerator operation, wherein the regenerative coordination control unit is configured to increase the regenerative braking force corresponding to the amount of brake operation detected by the brake operation amount detecting unit and calculates a possible regenerative braking force by subtracting a maximum of the regenerative braking force from a basic target driving force, distributes the regenerative braking force and the hydraulic braking force within a range of the possible regenerative braking force based on the required value for vehicle braking and when the vehicle speed calculated by the vehicle speed calculation unit indicates zero or reverse movement, sets the regenerative braking force to zero to make the hydraulic braking force equivalent to the required value for vehicle braking and the control unit includes a vehicle speed calculation unit configured to calculate a vehicle speed and obtains a target driving force to be generated by the motor by calculating the basic target driving force based on the amount of accelerator operation detected by the accelerator operation amount detecting unit and the vehicle speed calculated by the vehicle speed calculation unit and adding a value to the basic target driving force, the value corresponding to the regenerative braking force distributed by the regenerative coordination control unit.

* * * * *